United States Patent [19]
Campbell et al.

[11] Patent Number: 4,889,773
[45] Date of Patent: Dec. 26, 1989

[54] RESISTANCE WELDING OF GALVANIZED STEEL

[75] Inventors: Donald H. Campbell, Niagara-on-the-Lake, Canada; Gerald L. Evarts, Tonawanda, N.Y.

[73] Assignee: Occidental Chemical Corporation, Dallas, Tex.

[21] Appl. No.: 245,483

[22] Filed: Nov. 7, 1988

Related U.S. Application Data

[62] Division of Ser. No. 59,298, Jun. 8, 1987, Pat. No. 4,794,050.

[51] Int. Cl.$^4$ ................................................ B22F 3/00
[52] U.S. Cl. .................................... 428/552; 428/553; 428/564; 427/58; 427/59; 427/60; 219/117.1; 219/119; 106/1.23; 106/1.26; 106/1.29; 106/1.27
[58] Field of Search ............... 219/117.1, 119; 427/58, 427/59, 60; 106/1; 428/555, 552, 564

[56] References Cited

U.S. PATENT DOCUMENTS

| | | | |
|---|---|---|---|
| 3,102,190 | 8/1963 | Chapleur | 219/117 |
| 3,519,783 | 7/1970 | Forsberg | 219/92 |
| 3,665,145 | 5/1972 | Engel | 219/119 |
| 3,884,705 | 5/1975 | Blair | 106/1 |
| 4,044,220 | 8/1977 | Glagola | 219/119 |

FOREIGN PATENT DOCUMENTS 59-146844 8/1984 Japan.
61-41540 2/1986 Japan.
61-253397 11/1986 Japan.

OTHER PUBLICATIONS

Honjo et al., "International Journal of Materials and Product Technology", vol. 1, No. 1, pp. 83–114, 1986.

Primary Examiner—Stephen J. Lechert, Jr.
Assistant Examiner—Ngoclan Mai
Attorney, Agent, or Firm—James F. Tao; James F. Mudd; Richard D. Fuerle

[57] ABSTRACT

A coating for improved resistance welding of galvanized steel parts or sheets comprises a binder, and a metal phosphide pigment, preferably a ferrophosphorus pigment, having a particle size of from about 0.1 to about 30 microns. The pigment can also include up to about 40% by weight of an additional metal such as tin, aluminum or lead, which can be combined with the metal phosphide in pigment form or deposited onto the surface of the particles. The coating can be applied to either the faying or non-faying surfaces of the galvanized steel, or to the resistance welding electrode, and may be removed, if desired, after the welding operation.

The advantages of the present invention include a significant reduction in welding current and an increase in the weldability lobe width, a restoration of the dynamic resistance beta peak, and an increase in electrode life.

7 Claims, No Drawings

RESISTANCE WELDING OF GALVANIZED STEEL

This is a division of application Ser. No. 059,298, filed June 8, 1987, now issued U.S. Pat. No. 4,794,050.

BACKGROUND OF THE INVENTION

The present invention relates to an improvement in the resistance welding of galvanized, i.e. zinc or zinc alloy coated, steel parts or sheets which is achieved by coating either the galvanized surface to be welded or the welding electrode with a resin binder containing a metal phosphide pigment, and preferably a ferrophosphorus pigment. The welding improvements realized by practicing the present invention are improved weldability lobes and dynamic resistance curves for better welding control for resistance welding systems as well as increased electrode life.

The use of galvanized steel sheets in the automotive industry has become increasingly popular in recent years due to the increase in concern for corrosion protection for automobile body panels. Corrosion problems are particularly severe in environments where salt is used for preventing the icing of snow on highway roads. Although efforts have been made to enhance the corrosion-resistance of steel sheets, such as by using various chemical conversion treatments and paint coatings, the corrosion protection method of choice currently is galvanized steel, with the galvanized coating formed by either hot-dipping or electrodeposition.

For zinc or zinc alloy coated sheet steels to successfully substitute for uncoated sheet steels, they must exhibit acceptable formability and weldability characteristics. As a general rule, coated steels have not demonstrated properties as good as their uncoated counterparts. Users of these products are continually looking for new coated sheet steels which provide the advantages of a coated steel, but have weldability and formability characteristics similar to uncoated steels.

The most common method of joining steel sheets (particularly in the automotive and appliance industries) is resistance spot welding. Resistance spot welding is ideally suited for joining thin sheet materials and is well adapted to mass production industries. In addition, operating costs for this process are relatively low. Resistance spot welding has been used with uncoated steels quite successfully since the 1930's.

Resistance spot welding is used to form joints between two materials. The process uses a set of electrodes to apply pressure to the weld area, to maintain the components in position, and to pass current through the weld. As the current flows, joule heating of the substrate occurs. Due in part to the cooling effects of the electrodes, a molten nugget eventually develops at the weld centerline or faying surface. On cooling, this nugget resolidifies and effects a joining between the two materials.

As mentioned, resistance spot welding of uncoated steels has historically been quite successful. However, the resistance spot weldability of coated sheet steels has not been as successful. The problems can be best seen by reference to some typical measures of spot weldability.

The weldability lobe is defined as the range of welding conditions (weld current and weld time) over which weld nuggets of an adequate size can be formed. This, in effect, defines a "window" of acceptable welding conditions. When practical, weld nugget sizes during lobe testing are estimated with a destructive test known as the peel test. This test consists of welding two 1¼-inch by 4-inch samples at two points, and destructively pulling apart the second of the welds. The weld nugget will usually adhere to one of the two sheets as a weld "button", and the size of this weld button can be measured with a set of calipers. The weld button size is usually considered a good measure of the nugget size. The limits of the weldability lobe are defined by the welding conditions which produce a minimum weld size on one side, and expulsion on the other (expulsion occurs when liquid metal is expelled from the weld during welding). A line representing a nominal button size (part way between the minimum and expulsion) is also often included.

The weldability lobes are characterized by lobe position, lobe width and the position of the nominal button line. See, generally, D. W. Dickinson, *Welding in the Automotive Industry*, Report SG 8-15 of the Committee of Sheet Steel Producers, the American Iron and Steel Institute. The lobe position is defined as the average welding current of the lobe. Though lobe position is not considered to be a critical weldability parameter, higher welding currents do result in higher energy costs, as well as a decrease in electrode life. More significant is the width of the weldability lobe defined as the difference in welding currents between minimum button and expulsion at a particular welding time. This is a measure of a materials' "flexibility" during spot welding. The position of the nominal button line, although considered of lesser importance, is also a measure of a materials' flexibility during spot welding. A central position for this line indicates a button size with adequate current range to both higher and lower currents.

Dynamic resistance is used as a measure of weld quality and is defined as the resistance of the weld across the electrodes (as a function of time) during welding. The dynamic resistance has been correlated to weld development in uncoated steels, and successfully used as an input signal for feedback control. Unfortunately, the results for zinc or zinc alloy coated steels have not been as good. In particular, feedback systems have been largely unsuccessful in controlling weld development in such coated steels which exhibit a featureless resistivity trace or curve. The dynamic resistance trace for uncoated steel, in contrast, exhibits a characteristic "beta peak", followed by a resistance drop. It is the presence of this "beta peak" which makes resistive feedback control possible. See Dickinson, supra.

When resistance welding uncoated steels, a single set of copper welding electrodes can be expected to make approximately 50,000 welds. When welding galvanized steels, however, the electrode life is reduced to about 1000–2000 welds or less. Since the production line must be stopped each time an electrode is replaced, at a considerable expense to the user, the relatively limited electrode life for galvanized steels represents a significant economic disadvantage.

The use of ferrophosphorus pigment for both improved corrosion protection and weldability has been suggested in the prior art. For instance, U.S. Pat. No. 3,884,705, issued May 20, 1975 and U.S. Pat. No. 4,119,763, issued Oct. 10, 1978, both disclose the use of coatings containing ferrophosphorus and zinc pigments, and a non-metallic corrosion inhibitor such as zinc chromate, as a replacement for zinc-rich coatings. These coatings also contain a non-metallic corrosion inhibitor such as zinc chromate. As contemplated in these patents, the ferrophosphorus pigment-containing coating is applied to bare steel panels rather than to galvanized sheets. The ferrophosphorus pigment used in such applications is commercially available from the Occidental Chemical Corporation under the trademark Ferrophos ® pigment.

A ferrophosphorus pigment dispersed in a resin to bind adjacent steel plates to form a vibration-damping composite suitable for resistance welding is disclosed in Japanese Patent Application No. 61-41540, published on Feb. 27, 1986.

The use of a coating comprising a resin, ferrophosphorus powder and mica powder applied to a steel sheet having a layer of fused aluminum or an aluminum/zinc alloy is disclosed in Japanese Patent Application No. 591456884, published Aug. 22, 1984. The steel sheet described in this reference can be subjected to chemical conversion, and is further described as having excellent weldability, processability and corrosion and heat resistance.

The use of an iron layer containing less than about 0.5 weight percent phosphorus applied to a zinc/iron or zinc/nickel alloy electroplated steel sheet for improved surface properties is described by Honjo et al. in *International Journal of Materials and Product Technology*, Vol. 1, No. 1, pp. 83–114 (1986).

It will be appreciated by those skilled in the art that a continuing need exists for steel sheets which possess the durability and corrosion resistance of galvanized sheets but also possess the weldability advantages of bare steel.

SUMMARY OF THE INVENTION

In accordance with the present invention, a zinc or zinc alloy coated steel sheet or part with improved resistance welding characteristics has a top coating of a binder and a pigment consisting essentially of at least one metal phosphide selected from the group consisting of phosphides of iron, nickel, cobalt, tin, copper, titanium, manganese, molybdenum, tungsten, vanadium, tantalum and mixtures thereof. Preferably, the metal phosphide is ferrophosphorus pigment having a range of particle sizes of from about 0.1 to about 30 microns, and which is present in the coating composition in amounts of from about 30% to about 90% by weight of non-volatile components.

The metal phosphide coating can also be applied to a copper resistance electrode for improved weldability. An additional metal can be applied to the electrode surface prior to coating the electrode with the metal phosphide, the additional metal being selected from the group consisting of iron, nickel, cobalt, silver, manganese, vanadium, molybdenum and gold.

The pigment can also include up to about 40% by weight of a metal additive selected from the group consisting of tin, aluminum or lead. This metal additive can be physically combined with the ferrophos in pigment form or deposited onto the surface of the ferrophosphorus pigment. These additive metals are used to increase the electrode life.

The use of a coating containing a ferrophosphorus pigment applied to the faying surfaces of a galvanized steel sheet or part results in a substantial decrease in the welding current and an increase in the weldability lobe width as compared to galvanized steel. If such a coating is applied to the non-faying surfaces, or to the resistance welding electrode, an increase in electrode life results. In addition, the use of a coating containing ferrophosphorus pigment results in a restoration of the dynamic resistance beta peak to the dynamic resistance trace.

DESCRIPTION OF THE PREFERRED EMBODIMENTS

The steel sheets or formed parts which are used in the present invention contain a thin layer of zinc metal or a zinc alloy which is direct contact with the steel surface. Typically, the zinc layer has a thickness of about 0.5 mils. The steel substrate itself if generally about 30 mils thick. Thin steel sheets of this type are used extensively in the automotive and appliance industries for forming auto and appliance bodies. The zinc or zinc alloy coating or layer is typically applied to the steel sheet using well-known techniques such as hot-dip galvanizing, where the sheet is contacted with molten zinc, or electrogalvanizing, where zinc or a zinc alloy coating is applied to the substrate by electrodeposition. This invention, however, does not contemplate the further treatment of steel sheets having a layer of highly electrically resistant material such as Zincrometal. A steel sheet or part having this coating is characterized by a high surface resistance which results in the absence of a dynamic resistance beta peak.

The metal phosphide pigment of the present invention comprises particles having an average size within the range of from about 0.1 to about 30 microns. Particles within the desired size ranges are suitably obtained by pulverizing the metal phosphide using conventional techniques. Suitable metal phosphides include phosphides of iron, nickel, cobalt, tin, copper, titanium, manganese, molybdenum, tungsten, vanadium, tantalum, as well as mixtures of these metal phosphides. The preferred metal phosphide is iron phosphide, which includes various ratios of iron and phosphorus, and particularly ferrophosphorus, which is an iron phosphide compound containing from about 20% to 28% of phosphorus and corresponding chemically to a mixture of $Fe_2P$ and $FeP$. Ferrophosphorus is obtained as a by-product in the commercial manufacture of elemental phosphorus by the electric furnace reduction of phosphate ores, with the iron present in the phosphate ores forming the ferrophosphorus. Ferrophosphorus typically contains impurities, of which silicon and manganese are the major impurities, typically being present in amounts of up to 5% by weight, and is further characterized as being electrically and thermally conductive, brittle, and substantially unreactive in water, dilute acidic or alkaline environments. A particularly suitable ferrophosphorus pigment is Ferrophos ® pigment which is manufactured and sold by the Occidental Chemical Corporation.

A coating composition containing the metal phosphide pigment of the present invention may be formulated by admixing the metal phosphide particles with a suitable binder, also using conventional mixing techniques. More specifically, when the metal phosphide of the present invention is incorporated into a coating formulation, the binder component of the formulation comprises 5% to 96% by weight of non-volatile components, and preferably from 10% to 70% by weight of the non-volatile components. Various binder materials, both organic and inorganic, may be used, the choice of a particular binder being dependent upon the characteristics which are desired for the particular application. Typical binders include various synthetic resins, such as epoxies, chlorinated rubber, polystyrene, polyvinyl acetate resins, silicones, silanes, borates, silicates, acrylics, polyurethanes and the like. In some applications, it may be desirable to apply a coating which can be readily removed after the welding operation. Typical binders of this type, i.e. those which are readily removable, include, by way of illustration, carboxymethyl cellulose, ethyl cellulose, polyvinyl alcohol, natural gums, etc. Other suitable binders not specifically described herein will be readily apparent to those skilled in the art.

The metal phosphide pigment can be present in the coating in an amount of from about 4% to about 95% by weight of the total non-volatile components in the coating, with amounts within the range of from about 30% to about 90% by weight being preferred. A portion of the metal phosphide particles of the pigment can be replaced by other metals such as tin, aluminum and lead. These additional metals can be present in amounts of up to about 40% by total weight of the pigment, and will typically have an average size within the range of from about 0.1 to about 30 microns. Alternatively, the additional metal can be deposited directly onto the surface of the metal phosphide particles using techniques which are well-known to those skilled in the art, such as by physically grinding or blending mixtures of the metal phosphide and added metal in the desired proportions, or by immersion coating, etc.

Depending upon the particular binder which is selected, the coating composition may also contain suitable solvents, curing agents, suspending agents, plasticizers and the like. The selection of the type and amounts of these other components will of course depend upon the particular binder as well as the ultimate characteristics desired for the coating and its use.

The formulated coating may be applied directly to the substrate using any available technique such as, for example, spraying, brushing, immersion, flowing or the like. If desirable, an intermediate conversion coating can be applied to the substrate prior to the application of the metal phosphide-containing coating. Typically, the coating is applied to produce a film having a thickness within the range of about 0.1 to 10 mils, although thicknesses which are outside of this range may also be used to advantage.

In another embodiment, the coating containing the metal phosphide can be applied to the resistance electrode rather than or in addition to application of the coating to the substrate. In this embodiment, the resistance welding electrode can be first coated with a metal selected from the group consisting of iron, nickel, cobalt, tin, copper, titanium, manganese, molybdenum, tungsten, vanadium, tantalum, and mixtures thereof prior to application of the metal phosphide-containing coating. Suitable methods of applying the coating to the resistance electrode include spraying, brushing, contact with an expendable ribbon containing the metal phosphide, and other methods as will be readily appreciated by those skilled in the art.

The coating containing the metal phosphide can be applied to either the faying or the non-faying surfaces of the steel sheet or part, or both as desired. Application of the coating to only the faying surfaces results in improvements in the welding lobe curve and dynamic resistance curve, while application of the coating to the non-faying surfaces results in improvements in electrode life. The presence of the ferrophosphorus-containing at the faying surfaces reduces shunt currents and, consequently, the temperature of the electrode, increasing electrode life.

The following specific examples are provided as exemplary of various embodiments of the present invention, but are not intended to limit the full scope of the invention as defined by the appended claims.

EXAMPLES 1-3

Lobe curves were generated using procedures established by Fisher Body Specification MDS-247 for galvanized steel. Welding conditions were as follows:

Welding Electrodes: RWMA Class II, 45 degree truncated cone, 0.25 inch face diameter
Welding Force: 500 pounds
Welding Times: 11, 14, 16 and 19 cycles
Minimum Nugget Size: 0.16 inch
Nominal Nugget Size: 0.20 inch This test consists of welding two 1¼-inch by 4-inch coupons 0.03 inches thick at two locations, and destructively pulling apart the second weld. The diameter of the peeled weld nugget was measured to determine the position of the limit lines which comprise the weldability lobe. The orientation of the coupons was such that the coating on the top coupon was at the electrode-to-sheet interface, and the coating on the bottom coupon was at the sheet-to-sheet interface.

Dynamic resistance traces were also obtained for welds made on each of the materials to help interpret nugget development during spot welding. These curves were also used to characterize each material's suitability to feedback control. These were obtained both across the welding tips and where necessary across the sheets.

The resistance welding characteristics of untreated coupons as well as coupons having various zinc metal or zinc alloy coatings was evaluated. The hot-dipped galvanized layer was applied in amounts of from about 0.9 to about 1.25 oz. of metal per square foot, while the Zincrometal coating was about 0.5 mils thick. The types of coupons evaluated were as follows:

| EXAMPLE NO. | COATING |
| --- | --- |
| 1 | None |
| 2 | Hot-dipped galvanized |
| 3 | Zincrometal |

The weldability of the coupons of Examples 1-3 was evaluated, and the results of the evaluation are shown in Table 1.

TABLE 1

| Example No. | Lobe Width (Amps.) | Nominal Location of Lobe (Amps.) | Presence of Dynamic Resistance Beta Peak |
| --- | --- | --- | --- |
| 1 | 2000 | 8300 (central) | Yes |
| 2 | 1600 | 11200 (min.) | No |
| 3 | 1800 | 7200 (central) | No |

EXAMPLES 4-6

The metal phosphide-containing coating of the present invention was evaluated using an epoxy ester binder containing 92% by weight of a ferrophosphorus pigment, designated FERROPHOS ® HRS 2131 with a mean particle size of 5 microns, which is manufactured and sold by the Occidental Chemical Corporation.

This coating was sprayed onto various substrate materials to a thickness of 1 mil as follows:

| EXAMPLE NO. | SUBSTRATE |
| --- | --- |
| 4 | Bare Steel |
| 5 | Hot-dipped galvanized steel |
| 6 | Zincrometal coated steel |

The weldability of the coupons of Examples 5–7 was evaluated, and the results of the evaluation are shown in Table 2.

TABLE 2

| Example No. | Lobe Width (Amps.) | Nominal Location of Lobe (Amps.) | Presence of Dynamic Resistance Beta Peak |
| --- | --- | --- | --- |
| 4 | 2000 | 7700 (min.) | Yes |
| 5 | 3000 | 8700 (central) | Yes |
| 6 | 2400 | 8700 (min.) | No |

The above-described examples demonstrate the improvement in resistance welding characteristics which is obtained following the procedure of the present invention. The welding current required on the galvanized sheets decreased substantially and the lobe width increased significantly following application of the metal phosphide-containing coating. In addition, the presence of a beta peak was also detected after application of the metal phosphide-containing coating. When a high electrically resistant layer is present, such as for a Zincrometal coating, the dynamic resistance beta peak does not occur, thus adversely affecting dynamic resistance feedback control.

EXAMPLES 7–24

Ferrophos-containing coatings were applied to bare steel test panels, hot-dipped galvanized steel test panels, and hot-dipped galvanized steel test panels that had a conversion coating. The conversion coatings employed were Bonderite 37, a zinc phosphate coating, and Bonderite 1303, a complex oxide coating. The binder was an epoxy ester resin, and the coating was spray-applied to a thickness of 0.4 mils on both sides of the test coupon.

The coated test panels were subjected to resistance welding tests to determine whether they would weld. The welding conditions used were similar to those of Example 1, and the results are summarized in Table 3.

TABLE 3

| Example No. | Surface Treatment | Amount of Ferrophos (wt. %) | Weldable |
| --- | --- | --- | --- |
| 7 | None | None (Control, no binder) | Yes |
| 8 | None | 0 (Binder only) | No |
| 9 | None | 45 | Yes |
| 10 | None | 61 | Yes |
| 11 | None | 76 | Yes |
| 12 | None | 86 | Yes |
| 13 | Bonderite 37 | None (Control, no binder) | No |
| 14 | Bonderite 37 | 0 (Binder only) | No |
| 15 | Bonderite 37 | 45 | No |
| 16 | Bonderite 37 | 61 | No |
| 17 | Bonderite 37 | 76 | Yes |
| 18 | Bonderite 37 | 86 | Yes |
| 19 | Bonderite 1303 | None (Control, no binder) | Yes |
| 20 | Bonderite 1303 | 0 (Binder only) | Yes |
| 21 | Bonderite 1303 | 45 | Yes |
| 22 | Bonderite 1303 | 61 | Yes |
| 23 | Bonderite 1303 | 76 | Yes |
| 24 | Bonderite 1303 | 86 | Yes |

The results shown in Table 3 demonstrate the effectiveness in terms of weldability of Ferrophos-containing coatings applied to galvanized steel with or without conversion coatings at various pigment to binder loadings.

EXAMPLE 25

A Ferrophos-containing coating having a removable gelatin-based binder and containing about 86% by weight of pigment was applied to hot-dipped galvanized steel test panels to a thickness of 0.5 to 1.0 mils. After drying, the panels were resistance welded. The welding proceeded normally, and after cooling the panels were subjected to an aqueous wash which effectively removed the remaining coating, leaving the surface suitable for subsequent finishing.

EXAMPLES 26–30

Ferrophos-containing coatings were prepared to evaluate the use of tin, lead and aluminum in combination with the Ferrophos pigment. The Ferrophos pigment used was Ferrophos grade HRS 2132, having an average particle size of about 3.0 microns and available from Occidental Chemical Corporation.

Three pigment compositions were prepared by grinding 15 grams of either the tin, lead or aluminum powder with 500 grams of Ferrophos in a ball mill for 16 hours. The tin powder used was MD 301, available from Alcoa Aluminum Co., the lead powder used was obtained from Fisher Scientific Co., and the aluminum powder used was from Matheson, Coleman and Bell. A fourth pigment used was 15 grams of tin powder which was added to 500 grams of Ferrophos without grinding. A control pigment was used with Ferrophos alone, subject to the same milling, for comparison purposes.

Coatings were prepared using 200 grams of each pigment listed above, 30 grams of an epoxy ester resin (Reichhold Epotuf 38-4071), 2 grams of fumed silica (Cab-O-Sil), 1 gram of hydrophobic fumed silica (Aerosil R972), and 0.1 gram of cobalt naphthenate. The solvent used was xylene.

The coatings were spray-applied to 4"×12" hot-dipped galvanized test panels, aged, and subjected to testing. Test strips for each coating were all successfully resistance welded.

Although the present invention has been described with respect to several illustrative embodiments, it should not be interpreted as being so limited. As will be evident to those skilled in the art, other substitutions and equivalents are possible without departing from the spirit of the invention or the scope of the claims.

What is claimed is:

1. A resistance welding electrode having improved resistance welding characteristics, said electrode having a coating comprising a binder and a pigment, said pigment comprising at least one metal phosphide selected from the group consisting of iron, nickel, cobalt, tin, copper, titanium, manganese, molybdenum, tungsten, vanadium, tantalum, and mixtures thereof.

2. The electrode of claim 1 wherein the metal phosphide is ferrophosphorus.

3. The electrode of claim 1 wherein the pigment comprises particles having an average size within the range of about 0.1 to about 30 microns.

4. The electrode of claim 1 wherein the pigment also contains up to about 40% by weight of particles of a metal selected from the group consisting of tin, aluminum, lead, and mixtures thereof.

5. The electrode of claim 4 wherein the metal particles have an average size within the range of about 0.1 to about 30 microns.

6. The electrode of claim 1 wherein the ferrophosphorus particles are coated with a layer of a metal selected from the group consisting of tin, aluminum and lead.

7. The electrode of claim 1 which contains an intermediate layer of a metal selected from the group consisting of iron, nickel, cobalt, silver, manganese, vanadium, molybdenum and gold.

* * * * *